March 14, 1944.  A. FISHKO  2,343,896
SANITARY AND SAFETY PIPE-FLOOR CONNECTION
Filed Oct. 3, 1941  3 Sheets-Sheet 1

INVENTOR.
ABRAHAM FISHKO.
BY

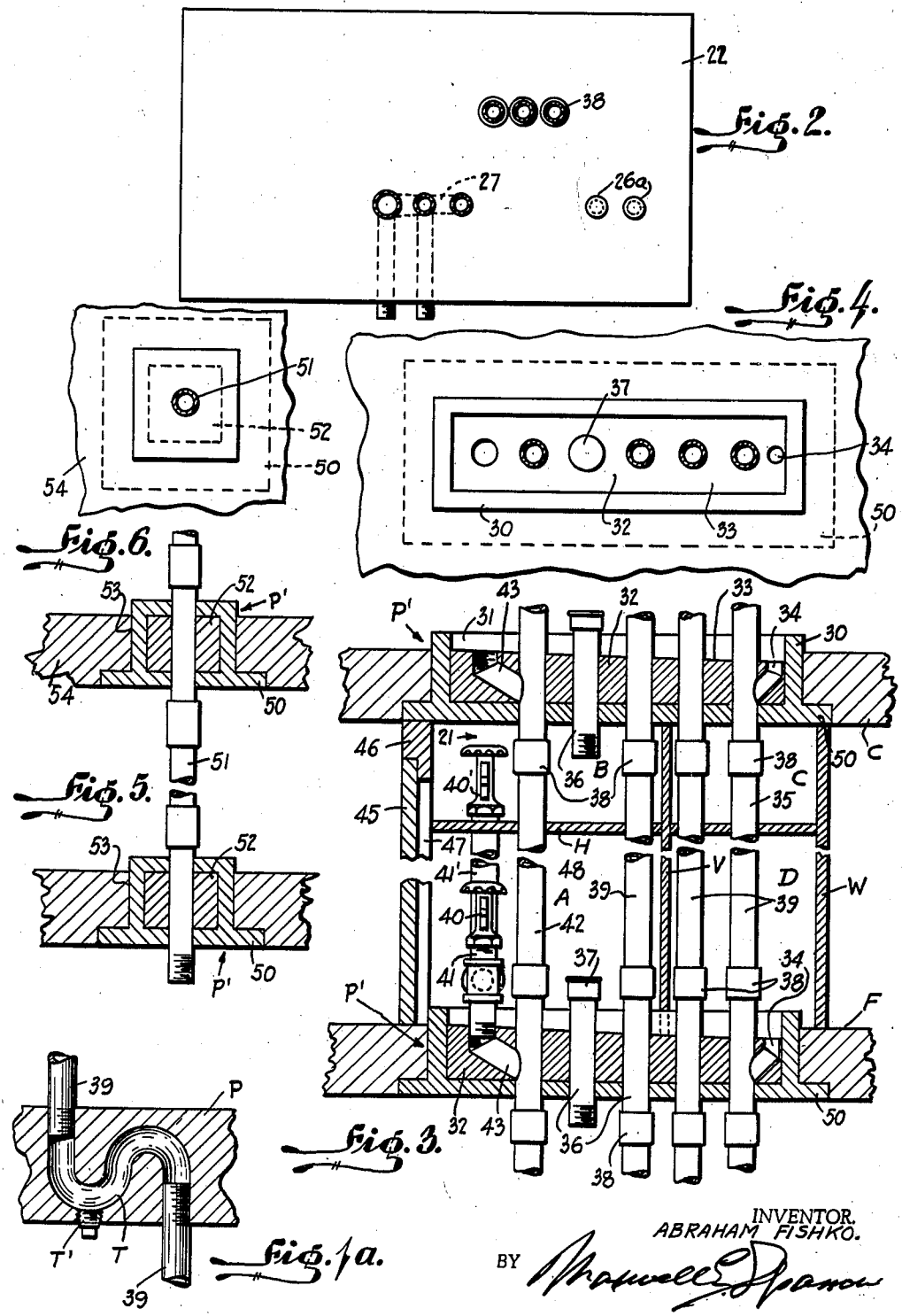
March 14, 1944. A. FISHKO 2,343,896
SANITARY AND SAFETY PIPE-FLOOR CONNECTION
Filed Oct. 3, 1941 3 Sheets-Sheet 2
INVENTOR.
ABRAHAM FISHKO.
ATTORNEY

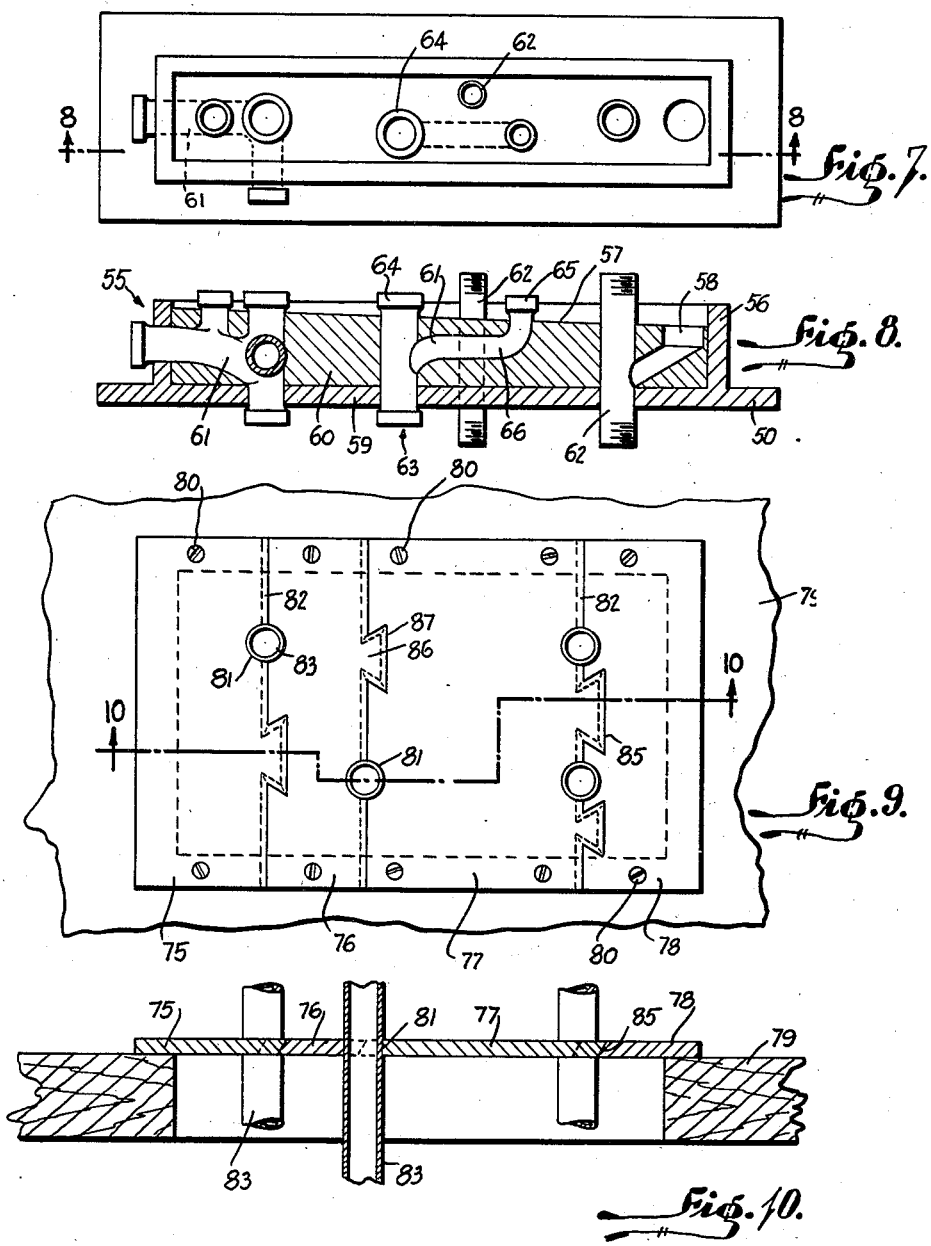

Patented Mar. 14, 1944

2,343,896

UNITED STATES PATENT OFFICE 2,343,896

SANITARY AND SAFETY PIPE-FLOOR CONNECTION

Abraham Fishko, Brooklyn, N. Y.

Application October 3, 1941, Serial No. 413,592

12 Claims. (Cl. 20—1)

This invention relates to devices for preventing fire, smoke, air drafts, vermin and water drippings from running along the exterior of pipe lines.

In present building and similar structures there usually exist cracks, fissures, openings or weaknesses around drain, water, heating, etc., pipes. Such cracks or openings form passages as well as hiding places for vermin. Furthermore, in case of a fire starting on one floor of a building, such cracks, openings, etc., will be inducive to drafts carrying smoke, sparks and flames from one floor to another, thereby spreading the fire hazard.

As a result of washing of floors or accidental flooding of floors, water may flow along the pipes through the cracks or openings from the floor above to the floor below. Furthermore, pipes carrying water or waste matter are inclined to sweat or drip causing the material theresurrounding to become moist, damp and/or discolored.

It is an object of the present invention to provide a seal for an opening in a structure through which a pipe line or the like passes, the seal including a pipe fitting connecting with the pipe line and forming a continuation thereof.

It is a further object of the present invention to provide such a seal with drainage means to drain off any liquids which may have accumulated thereon by reason of the sweating of the pipe or otherwise.

It is a still further object of the present invention to provide a seal around heating, water and other pipes passing from one floor to another of a structure, which will enhance the appearance of that portion of the floor or ceiling through which such pipes pass, as well as prevent passage of foreign matter, including vermin and water, through the floors and ceilings of the structure.

It is yet another object of the present invention to create an adequate fire stop adapted with pipe connections, to which necessary pipe lines in the buildings are attached, thus avoiding openings within the construction of the buildings adjacent pipe lines which would create drafts fanning a blaze in the event of fire breaking out at any one point near the said device.

With the above and other ends in view, and in attaining the above and other objects and advantages, to be hereinafter set forth, the invention consists in the matters hereinafter set out, and more particularly pointed out in the appended claims, reference being made to the accompanying drawings, in which:

Fig. 1a is a cross-sectional view taken through a portion of a plate embodying the invention;

Fig. 2 is a sectional view taken along line 2—2 of Fig. 1;

Fig. 3 is a diagrammatic piping arrangement embodying the invention in a modified form;

Fig. 4 is a top plan view of Fig. 3;

Fig. 5 is a diagrammatic piping arrangement embodying the invention in a further modified form, employing a single pipe;

Fig. 6 is a top plan view of Fig. 5;

Fig. 7 is a top plan view showing the invention in a still further modified form;

Fig. 8 is a sectional view taken along line 8—8 of Fig. 7;

Fig. 9 is a top plan view of another embodiment of the invention, employing sectional plates; and Fig. 10 is a sectional view taken along line 10—10 of Fig. 9.

Figure 1:
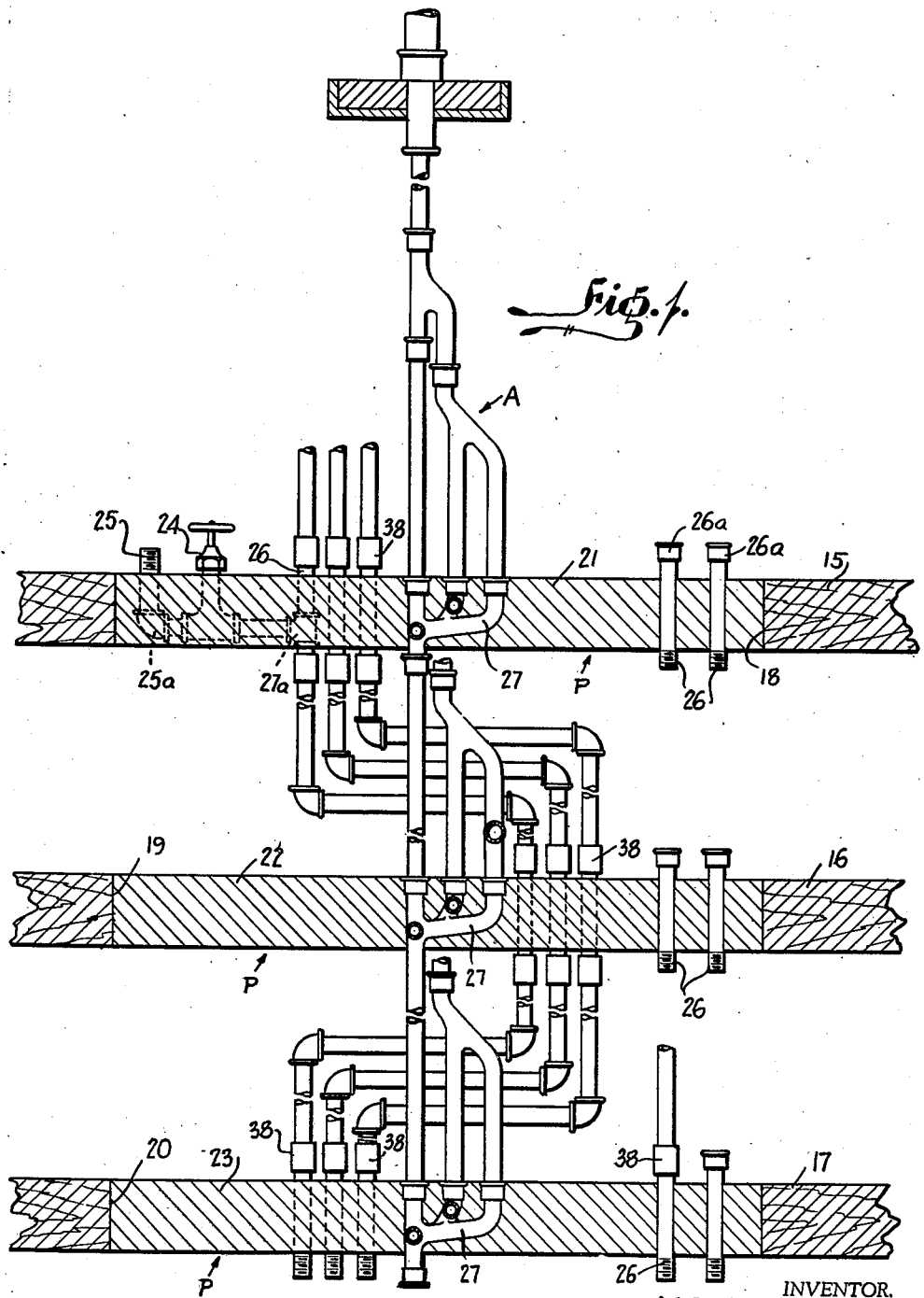
Fig. 1 is a diagrammatic elevational view (partly in section) embodying the invention in one of its forms, the same being shown as covering three floors and roof of a building.

Referring now more particularly to the drawings, there is disclosed in Fig. 1 a piping diagram generally designated by the letter A passing through successive floor beams 15, 16 and 17 of successive tiers of beams of a building (not shown). These floor beams 15, 16 and 17 are provided with pipe passages or openings 18, 19 and 20, respectively. These passages or openings are closed by means of pan members or plates 21, 22 and 23, respectively, also generally indicated by the letter P and substantially the depth of the floor beams. These plates are preferably made of suitable metal and are provided with pipe members or pipe fittings, such as valves 24, connecting pipes 25, pipe nipples 26, branch fittings 27, connecting T's 27a, etc. These members or fittings are made integral with pan or plate-like member 24 during the manufacture thereof, the same being provided by forming suitable openings of predetermined sizes during casting of the pan or plate member; or by expanding the metal, or by inserting pipe fittings in the mold before casting the plate, thus making such fittings a unit with the plate. In the case of concrete constructions, the pan members P would be disposed within the floor arch defined by the space between beams of successive tiers.

These fittings may comprise conventional combination vent branches, combination crosses and vents, combination T's and vents, sanitary sweep T's, etc. It is understood that any other types of piping and pipe fittings can be made integral with plates P and in accordance with the specific requirements of a particular building in which they are to be used.

Fig. 1a shows the plate P having formed therein a trap T having the conventional plug T' and also portions of pipe 39 connected in a conventional manner to plate P. This trap when formed in the plate eliminates additional joints and prevents leaks.

Fig. 3 is an enclosure 48 to conceal the piping arrangement of the building provided in a shaft having a rear partition W. This shaft may contain a horizontal partition H and a vertical partition V dividing the said enclosure 48 into the compartments A, B, C and D between the floor F and ceiling C. The space in these compartments through which respective pipes pass, may be employed for useful purposes, as for example to hold refrigeration and heat radiating apparatus or for storage or other purposes. The shaft may be the space between two adjacent walls or the vertical space running through a building for containing the pipe lines.

Since moisture from condensation or otherwise may accumulate in these various compartments, it is preferable to provide outlets 34 in said compartments to drain the same into a drain pipe 35. Also it is preferable to provide a sprinkler or extinguisher 40 or 40' in each compartment to minimize fire hazard.

As shown in Figs. 3 and 4, the wall portion 30 (of heat insulating material) may be constructed to form a ridge 31, while the plate 32 may be constructed to form an incline 33 towards a drain hole 34, which drain hole 34 will lead to the conventional drain pipe 35. Pipe nipples 36 are embedded in plate or pan member P' which includes plate 32, and those not being used are covered by means of conventional pipe caps 37. Otherwise, conventional couplings 38 are used to connect the nipples 36 to pipes 39. At 40, 40', the sprinkler heads are shown as being attached by means of nipples 41, 41' to water pipe 42, by means of a passage 43 provided in plate 32 so as to connect the pipe 42 with nipple 41.

In instances where the pipes are located such as to permit same to be closed in, conventional doors 45 may be used, hingedly secured to a door frame 46. Opening 47 will permit communication with space 48 in which the various pipes are concealed.

As illustrated in Figs. 3 to 8 inclusive, a flange 50 is provided in the plate member P' or 55 to facilitate the securement of said member to the floor arch 79 of the rooms through which the piping passes. It is understood that the visible bottom surface of such flange 50 may be covered with decorative design (not shown) as desired.

In Figs. 3 and 4, a plurality of pipe connections are shown; whereas, in Figs. 5 and 6, there is depicted the plate member P' having an integral pipe fitting passing through its plate 52 and connected to a single pipe 51, said plate P closing an opening 53 in floor 54 through which the pipe 51 passes.

In Figs. 7 and 8, another typical plate arrangement is illustrated, the plate member 55 comprising insulating member 59 provided with side walls 56 and enclosing plate 60 having an inclined floor 57 draining towards a drain hole 58. Embedded in the plate 60 and the insulating member 59 are various types of conventional pipe connections 61 and nipples 62.

Some of the pipe fittings shown in Fig. 8 may be conventional waste pipe fittings 63 having two inlets 64, 65, connected by means of a horizontal branch 66, thus forming a Y fitting. Many variations of pipe fittings may be included.

Instead of using actual pipe fittings, it is understood that equivalent ducts or passages may be cast or formed in the plate or pan during process of manufacture, which ducts may have their inlet and/or outlet either flush with the surface of the pan or projected therebeyond. Therefore, where the term "pipe fitting" is used in the claims, it is to be understood that this term also embraces or means such passages or the equivalent thereof.

In instances where it is desired to dispose the plate member around existing pipes, the said plate member may be constructed in interengaging or interlocking sections, as illustrated in Figs. 9 and 10, one or more sections being provided with integral pipe nipples or fittings as aforementioned. The typical arrangement shown in Fig. 9, provides for four plate sections 75, 76, 77 and 78, inclusive. These plate sections may be secured to the floor arch 79 by means of screws 80. Passages 81 are cut out of the bevelled edges 82 of such sections to facilitate the passage of pipes or pipe nipples 83. To insure a tight fit of such sections of plates, the same may be bevelled as clearly illustrated at 85.

Auxiliary locking means may be provided for these sectional plates 75—78 inclusive, in the form of bevelled tongue members 86 registering with notches 87, as clearly illustrated in Fig. 9.

From the foregoing it will be readily seen that means of simple construction have been provided to overcome any and all difficulties encountered by plumbers, steam fitters, etc., when installing pipings in buildings as regards openings left around pipes in ceilings and floors of a building, which in many cases are not only unsightly but also a danger to the health and safety of occupants or tenants. As hereinbefore mentioned such cracks promote infestation of vermin as well as offering a passage for odors, smoke, condensation from one floor to another.

While typical plate and pipe nipple arrangements are shown, it is, of course, understood that many other combinations and arrangements are possible to be manufactured as to meet varied local conditions.

With regard to the plates shown in Figs. 9 and 10, many variations are possible, such as, for example, the omission of the locking tongue and notch portions. The edge of the opening 81 may be closed by soldering, cementing, etc., after the cover plate has been installed.

Thus, there has been provided herein a pan or plate-like member (P of Fig. 1, P', 32 of Figs. 3, 4; 55 of Fig. 8) in a structure having an opening, said member having a passage comprising a pipe fitting (27 of Figs. 1, 2; 36, 43 of Fig. 3; 61, 62, 63 of Fig. 8) forming an integral part of said member, said member being secured to said structure adjacent said opening sealing said opening around said pipe-fitting, the pipe-fitting being adapted for connection to a pipe line (A of Fig. 1; 42 of Fig. 3), forming a continuation of said pipe-line when the latter is connected to said pipe-fitting, said member being adapted to receive foreign matter, and outlet means (34, 35 of Figs. 3, 4) for discharging said foreign matter from said plate-like member.

This application is a continuation in part of application Serial No. 240,749, filed November 16, 1938.

Although the foregoing is descriptive of the best known embodiments of the invention, it will be understood as descriptive, rather than restrictive, and subject to such changes and modifications as may come within the scope of the appended claims.

I claim:

1. In a pipe shaft between successive floors of a building, a pan member spanning the shaft opening at substantially each floor level, said member being secured to the floor arch and being of substantially the depth thereof, said member having passages comprising pipe fittings forming integral parts of said member and to which pipe lines may be connected, said pipe fittings providing continuations of respective of said lines when said lines are connected thereto, said member sealing the shaft opening substantially at the upper and lower levels of said arch.

2. In a pipe shaft between successive floors of a building, a pan member spanning the shaft opening at substantially each floor level, said member being secured to the floor arch and being of substantially the depth thereof, and hollow members comprising pipe fittings forming part of and being integral parts of said pan member, said fittings having extensions beyond surfaces of said pan member to which pipe lines may be connected, said fittings providing continuations of respective of said lines when said lines are connected thereto, said pan member sealing the shaft opening substantially at the upper and lower levels of said arch.

3. In a pipe shaft between successive floors of a building, a pan member spanning the shaft opening at substantially each floor level, said member being secured to the floor arch and being of substantially the depth thereof, and hollow members comprising pipe fittings forming part of and being integral parts of said pan member, said fittings having extensions beyond surfaces of said pan member to which pipe lines may be connected, said fittings providing continuations of respective of said lines when said lines are connected thereto, at least one of said hollow members being angular, said pan member sealing the shaft opening substantially at the upper and lower levels of said arch.

4. In a building structure having an opening, a plate, said plate having a passage comprising a pipe fitting forming an integral part of said plate, said plate being secured to said structure at said opening completely sealing said opening, said pipe fitting having means for connecting a pipe line thereto and said pipe fitting forming a continuation of said pipe line when the latter is connected thereto.

5. In a pipe shaft between successive floors of a building, a pan member spanning the shaft opening at substantially each floor level, said member being secured to the floor beams, and being of substantially the depth thereof, said member having passages comprising pipe fittings forming integral parts of said member and to which pipe lines may be connected, said pipe fittings providing continuations of respective of said lines when said lines are connected thereto, said member sealing the shaft opening substantially at the upper and lower levels of said beams, and panels at the sides of adjacent of said pan members forming a casing therewith and between two successive tiers of beams.

6. In a pipe shaft between successive floors of a building, a pan member spanning the shaft opening at substantially each floor level, said member being secured to the floor beams and being of substantially the depth thereof, said member having passages comprising pipe fittings forming integral parts of said member and to which pipe lines may be connected, said pipe fittings providing continuations of respective of said lines when said lines are connected thereto, said member sealing the shaft opening substantially at the upper and lower levels of said beams, panels at the sides of adjacent of said pan members forming a casing therewith and between two successive tiers of beams, and a shelf between said adjacent pan members dividing the said casing into compartments.

7. In a building structure having an opening, a pan member comprising a plurality of engaging sections, a pipe fitting formed from one of said sections and integral therewith, said member with said sections in engagement being secured to said structure at said opening completely sealing said opening, at least two adjacent of said members having complementary openings, which when said adjacent sections are in engagement provide a passage for an obstruction in the path of said member, and said pipe fitting having means for connecting pipe lines thereto.

8. In a building structure having spaced-apart openings, pipe lines passing through said openings, pan members, said members sealing respectively said openings, each of said members having through passages, and pipes of said lines joined to said members at said passages whereby said passages become part of said lines.

9. In a bulding structure having spaced-apart alined openings between adjacent beams of successive tiers of beams, pipe lines passing through said openings, pan members, said members sealing respectively said openings, each of said members having through passages, pipes of said lines joined to said members at said passages whereby said passages become part of said lines, and side walls between said successive tiers of beams providing with successive pan members an enclosure through which said pipe lines pass.

10. In a pipe shaft between successive floors of a building, a pan member spanning the shaft opening at substantially each floor level, said member being secured to the floor arch and being of substantially the depth thereof, said member having passages comprising pipe fittings forming integral parts of said member and to which pipe lines may be connected, said pipe fittings providing continuations of respective of said lines when said lines are connected thereto, said member sealing the shaft opening substantially at the upper and lower levels of said arch, said pan member being adapted to receive foreign matter therein, and outlet means for discharging said matter from said pan member.

11. In a pipe shaft between successive floors of a building, a pan member spanning the shaft opening at substantially each floor level, said member being secured to the floor beams, and being of substantially the depth thereof, said member having passages comprising pipe fittings forming integral parts of said member and to which pipe lines may be connected, said pipe fittings providing continuations of respective of said lines when said lines are connected thereto, said member sealing the shaft opening substantially at the upper and lower levels of said beams, panels at the sides of adjacent of said pan members forming a casing therewith and between two successive tiers of beams, and sprinkler means in said casing connected to said pan member.

12. In a building structure having spaced-apart openings, pipe lines passing through said openings, pan members, said members sealing respectively said openings, each of said members having through passages, pipes of said lines joined to said members at said passages whereby said passages become part of said lines, said pan members being adapted to receive foreign matter therein, and outlet means for discharging said matter from said pan members.

ABRAHAM FISHKO.